United States Patent
Misoczki et al.

(10) Patent No.: US 11,223,483 B2
(45) Date of Patent: Jan. 11, 2022

(54) ODD INDEX PRECOMPUTATION FOR AUTHENTICATION PATH COMPUTATION

(71) Applicant: Intel Corporation, Santa Clara, CA (US)

(72) Inventors: Rafael Misoczki, Hillsboro, OR (US);
Vikram Suresh, Portland, OR (US);
Santosh Ghosh, Hillsboro, OR (US);
Manoj Sastry, Portland, OR (US);
Sanu Mathew, Portland, OR (US);
Raghavan Kumar, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 258 days.

(21) Appl. No.: 16/456,064

(22) Filed: Jun. 28, 2019

(65) Prior Publication Data

US 2019/0319803 A1    Oct. 17, 2019

(51) Int. Cl.
*H04L 9/32* (2006.01)
*H04L 9/08* (2006.01)

(52) U.S. Cl.
CPC .......... *H04L 9/3247* (2013.01); *H04L 9/085* (2013.01); *H04L 9/0852* (2013.01); *H04L 2209/38* (2013.01)

(58) Field of Classification Search
CPC ..... H04L 9/3247; H04L 9/0852; H04L 9/085; H04L 9/3239; H04L 9/3249; H04L 9/3252; H04L 9/3236; H04L 2209/38
See application file for complete search history.

(56) References Cited

U.S. PATENT DOCUMENTS 10,511,445 B1 *  12/2019  Rubin ................... H04L 63/126
10,608,824 B1 *   3/2020  Praus ........................ H04L 9/14
(Continued)

FOREIGN PATENT DOCUMENTS

CN       112152793 A    12/2020
EP         3758285 A1   12/2020

OTHER PUBLICATIONS

Huelsing et al. XMSS: extended Merkle Signature Scheme (Year: 2018).*

(Continued)

*Primary Examiner* — Vu V Tran
(74) *Attorney, Agent, or Firm* — Jaffery Watson Mendonsa & Hamilton LLP

(57) ABSTRACT

In one example an apparatus comprises a computer-readable memory, signature logic to compute a message hash of an input message using a secure hash algorithm, process the message hash to generate an array of secret key components for the input message, apply a hash chain function to the array of secret key components to generate an array of signature components, the hash chain function comprising a series of even-index hash chains and a series of odd-index hash chains, wherein the even-index hash chains and the odd-index hash chains generate a plurality of intermediate node values and a one-time public key component between the secret key components and the signature components and store at least some of the intermediate node values in the computer-readable memory for use in one or more subsequent signature operations. Other examples may be described.

15 Claims, 14 Drawing Sheets

A private key can sign a multiple messages

(56) References Cited

U.S. PATENT DOCUMENTS

2019/0319798 A1* 10/2019 Chalkias ............... H04L 9/3247
2020/0358619 A1* 11/2020 Ding .................... G06Q 20/401

OTHER PUBLICATIONS

Communication—extended European search report for EP Application No. 20163668.5, reference I09550EP/CGS dated Aug. 26, 2020, 5 pages.

Hao Yuan, et al, "Efficient Distributed Third-Party Data Authentication for Tree Hierarchies", Distributed Computing Systems, 2008. ICDCS '08, The 28th International Conference on, IEEE, Piscataway, NJ, USA, Jun. 17, 2008 (Jun. 17, 2008), pp. 184-193, XP031303673, ISBN: 978-0-7695-3172-4.

Huelsing, A., "XMSS: extended Merkle Siganture Scheme; rfc8391 text" Internet Engineering Task Force, IETF; Standard, Internet Society (ISOC) 4, Rue Des Falaises CH-1205, Geneva, Switzerland, Jun. 1, 2018 (Jun. 1, 2018), pp. 1-74, XP015126339.

\* cited by examiner

US 11,223,483 B2

ODD INDEX PRECOMPUTATION FOR AUTHENTICATION PATH COMPUTATION

BACKGROUND

Subject matter described herein relates generally to the field of computer security and more particularly to odd index precomputation for authentication path computation.

Existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

Accordingly, techniques to accelerate post-quantum signature schemes such may find utility, e.g., in computer-based communication systems and methods.

BRIEF DESCRIPTION OF THE DRAWINGS

The detailed description is described with reference to the accompanying figures.

DETAILED DESCRIPTION

Figure 1A:
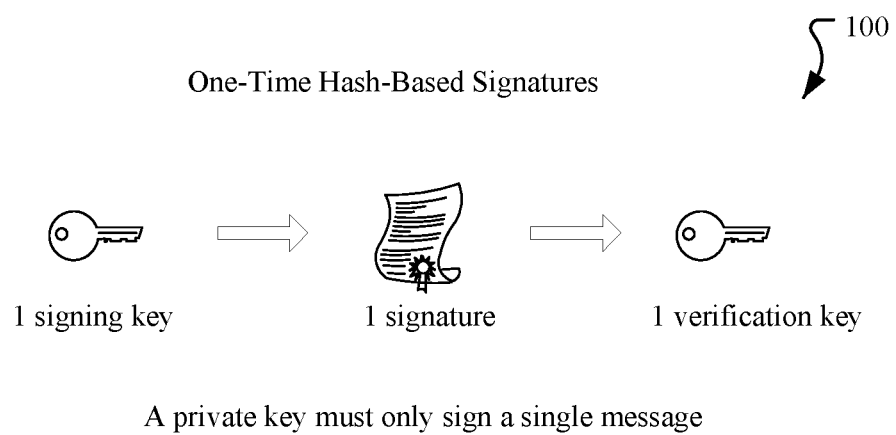
FIGS. 1A and 1B are schematic illustrations of a one-time hash-based signatures scheme and a multi-time hash-based signatures scheme, respectively.

Described herein are exemplary systems and methods to implement odd index precomputation for authentication path computation for post-quantum cryptography secure hash-based signature algorithms. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

As described briefly above, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. The eXtended Merkle signature scheme (XMSS) and/or an eXtended Merkle many time signature scheme (XMSS-MT) are hash-based signature schemes that can protect against attacks by quantum computers. As used herein, the term XMSS shall refer to both the XMSS scheme and the XMSS-MT scheme.

An XMSS signature process implements a hash-based signature scheme using a one-time signature scheme such as a Winternitz one-time signature (WOTS) or a derivative there of (e.g., WOTS+) in combination with a secure hash algorithm (SHA) such as SHA2-256 as the primary underlying hash function. In some examples the XMSS signature/verification scheme may also use one or more of SHA2-512, SHA3-SHAKE-256 or SHA3-SHAKE-512 as secure hash functions. XMSS-specific hash functions include a Pseudo-Random Function (PRF), a chain hash (F), a tree hash (H) and message hash function ($H_{msg}$). As used herein, the term WOTS shall refer to the WOTS signature scheme and or a derivative scheme such as WOTS+.

The Leighton/Micali signature (LMS) scheme is another hash-based signature scheme that uses Leighton/Micali one-time signatures (LM-OTS) as the one-time signature building block. LMS signatures are based on a SHA2-256 hash function.

An XMSS signature process comprises three major operations. The first major operation receives an input message (M) and a private key (sk) and utilizes a one-time signature algorithm (e.g., WOTS+) to generate a message representative (M') that encodes a public key (pk). In a 128-bit post quantum security implementation the input message M is subjected to a hash function and then divided into 67 message components (n bytes each), each of which are subjected to a hash chain function to generate the corresponding 67 components of the digital signature. Each chain function invokes a series of underlying secure hash algorithms (SHA).

The second major operation is an L-Tree computation, which combines WOTS+ (or WOTS) public key components (n-bytes each) and produces a single n-byte value. For example, in the 128-bit post-quantum security there are 67 public key components, each of which invokes an underlying secure hash algorithm (SHA) that is performed on an input block.

The third major operation is a tree-hash operation, which constructs a Merkle tree. In an XMSS verification, an authentication path that is provided as part of the signature and the output of L-tree operation is processed by a tree-hash operation to generate the root node of the Merkle tree, which should correspond to the XMSS public key. For XMSS verification with 128-bit post-quantum security, traversing the Merkle tree comprises executing secure hash operations. In an XMSS verification, the output of the Tree-hash operation is compared with the known public key. If they match, then the signature is accepted. By contrast, if they do not match then the signature is rejected.

The XMSS signature process is computationally expensive. An XMSS signature process invokes hundreds, or even thousands, of cycles of hash computations. Subject matter described herein addresses these and other issues by providing systems and methods to implement accelerators for post-quantum cryptography secure XMSS and LMS hash-based signing and verification.

Post-Quantum Cryptography Overview

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Although any post-quantum cryptography could be built on the current cryptography, the novel approach would need to be intelligent, fast, and precise enough to resist and defeat any attacks by quantum computers Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's HFE public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance.

Figure 1B:
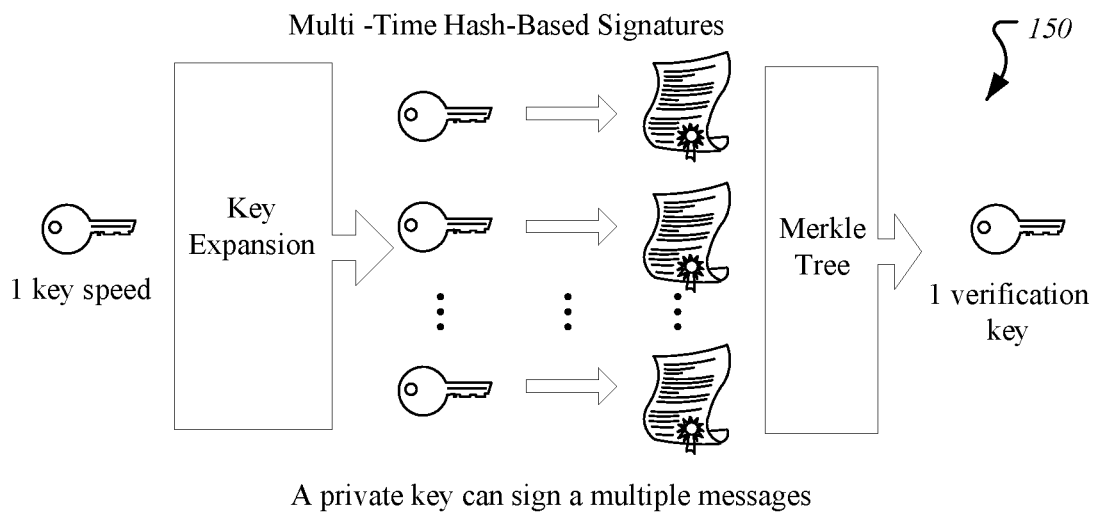

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), and SPHINCs scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessarily basic ingredients to counter the quantum counting and post-quantum computing challenges. HBS schemes are regarded as fast signature algorithms working with fast platform secured-boot, which is regarded as the most resistant to quantum and post-quantum computing attacks.

For example, as illustrated with respect to FIG. 1A, a scheme of HBS is shown that uses Merkle trees along with a one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
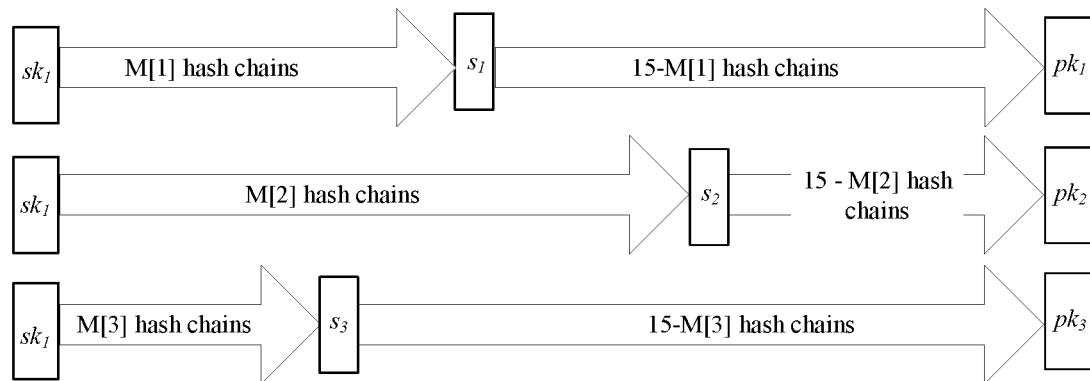
FIGS. 2A-2B are schematic illustrations of a one-time signature scheme and a multi-time signature scheme, respectively.
Figure 2A:
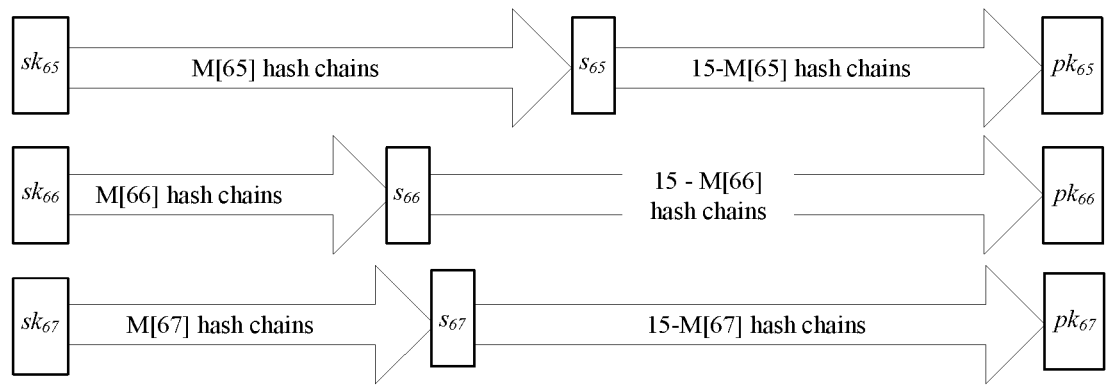
Figure 2B:
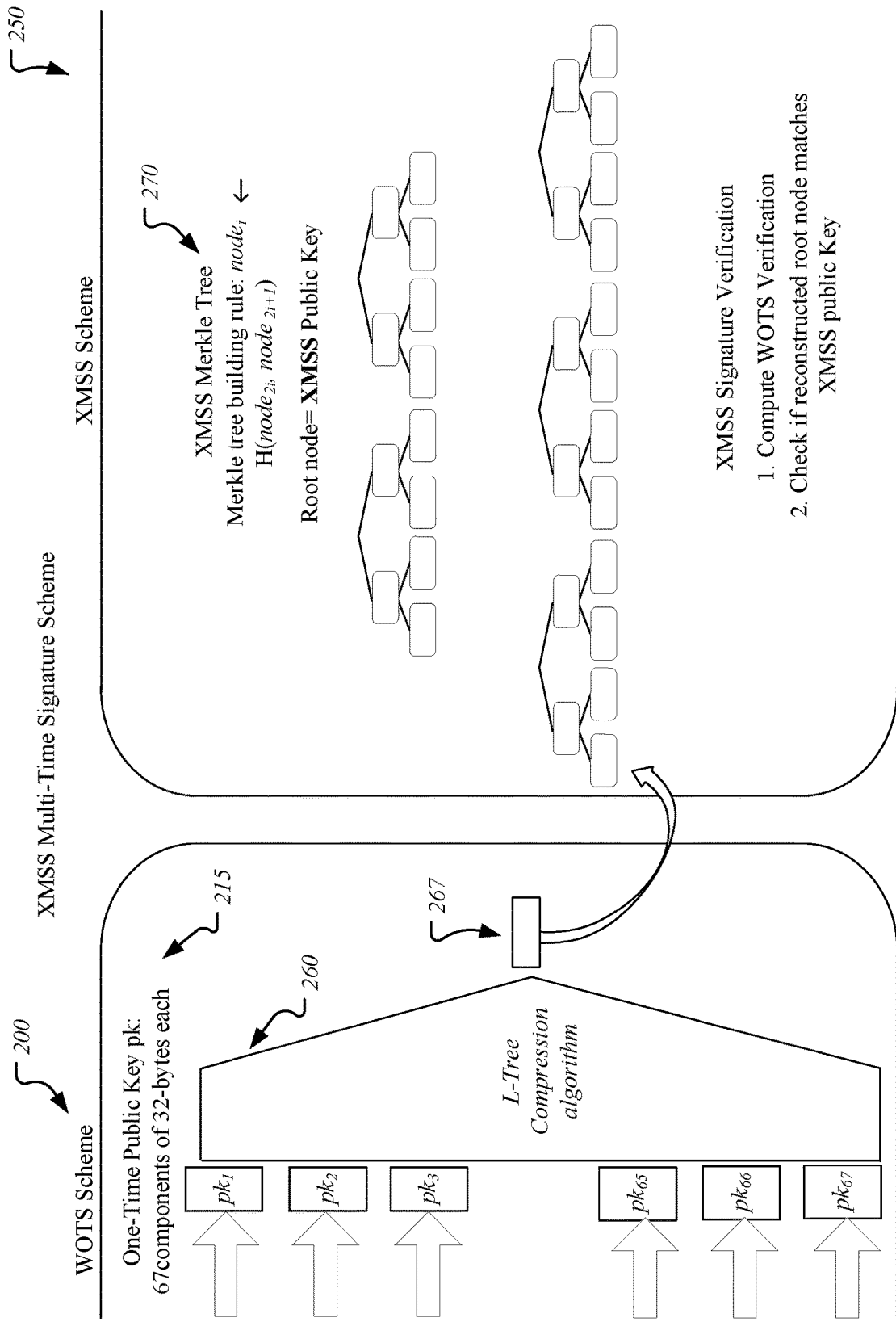

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS scheme 200, which was offered by Robert Winternitz of Stanford Mathematics Department publishing as hw(x) as opposed to h(x)lh(y), while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

FIG. 2B illustrates XMSS MTS scheme 250 that allows for a combination of WOTS scheme 200 of FIG. 2A and XMSS scheme 255 having XMSS Merkle tree. As discussed previously with respect to FIG. 2A, WOTs scheme 200 is based on a one-time public key, pk, 215, having 67 components of 32 bytes each, that is then put through L-Tree compression algorithm 260 to offer WOTS compressed pk 265 to take a place in the XMSS Merkle tree of XMSS scheme 255. It is contemplated that XMSS signature verification may include computing WOTS verification and checking to determine whether a reconstructed root node matches the XMSS public key, such as root node=XMSS public key.

Post-Quantum Cryptography Algorithms

Figure 3:
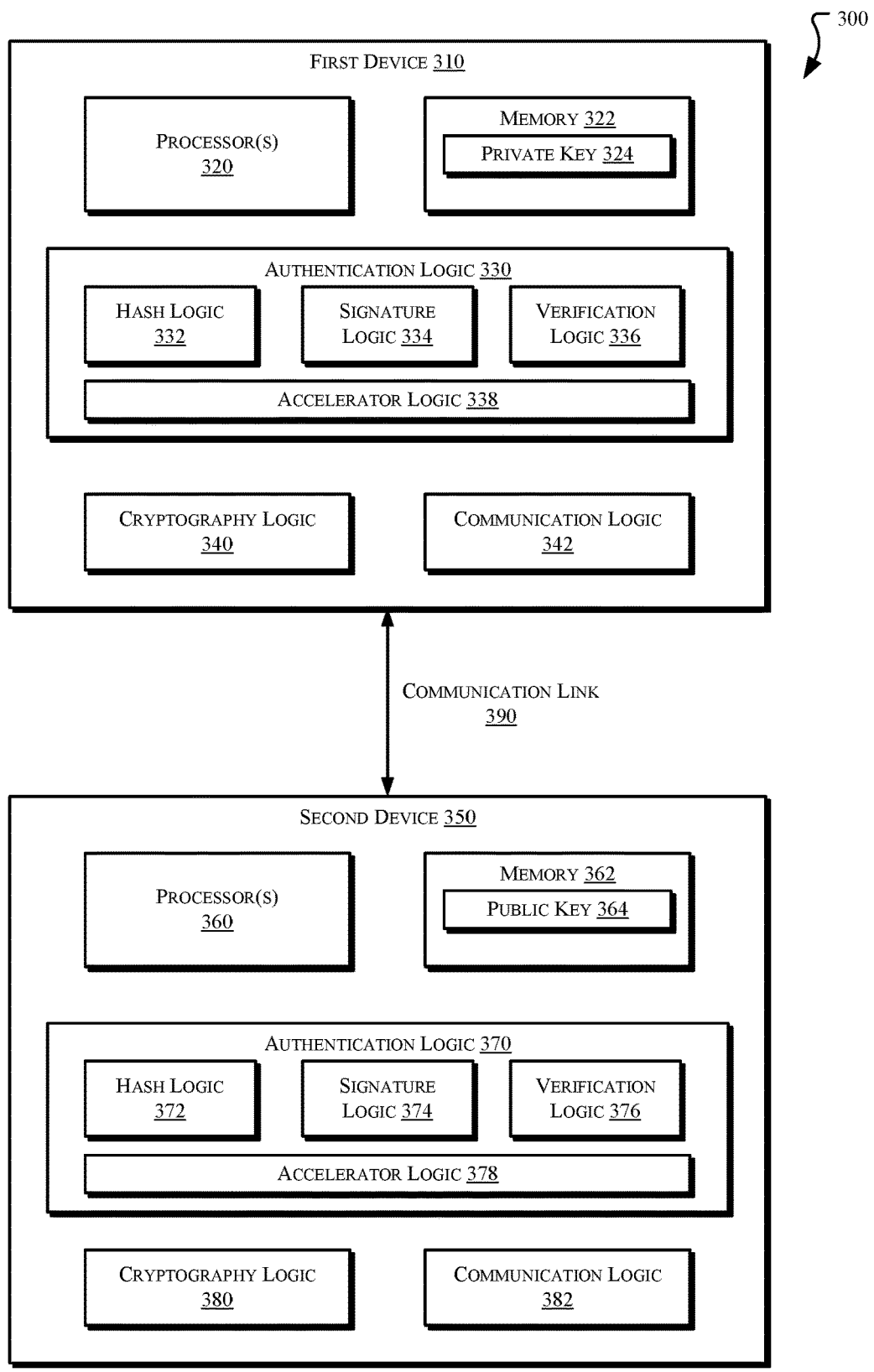
FIG. 3 is a schematic illustration of a signing device and a verifying device, in accordance with some examples.

FIG. 3 is a schematic illustration of a high-level architecture of a secure environment 300 that includes a first device 310 and a second device 350, in accordance with some examples. Referring to FIG. 3, each of the first device 310 and the second device 350 may be embodied as any type of computing device capable of performing the functions described herein. For example, in some embodiments, each of the first device 310 and the second device 350 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 310 includes one or more processor(s) 320 and a memory 322 to store a private key 324. The processor (s) 320 may be embodied as any type of processor capable of performing the functions described herein. For example, the processor(s) 320 may be embodied as a single or multi-core processor(s), digital signal processor, microcontroller, or other processor or processing/controlling circuit. Similarly, the memory 322 may be embodied as any type of volatile or non-volatile memory or data storage capable of performing the functions described herein. In operation, the memory 322 may store various data and software used during operation of the first device 310 such as operating systems, applications, programs, libraries, and drivers. The memory 322 is communicatively coupled to the processor(s) 320. In some examples the private key 324 may reside in a secure memory that may be part memory 322 or may be separate from memory 322.

First device 310 further comprises authentication logic 330 which includes memory 332, signature logic, and verification logic 336. Hash logic 332 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 332 may be configured to generate a signature to be transmitted, i.e., a transmitted signature. In instances in which the first device 310 is the signing device, the transmitted signature may include a number, L, of transmitted signature elements with each transmitted signature element corresponding to a respective message element. For example, for each message element, $m_i$, signature logic 332 may be configured to perform a selected signature operation on each private key element, $sk_i$ of the private key, sk, a respective number of times related to a value of each message element, $m_i$ included in the message representative m'. For example, signature logic 332 may be configured to apply a selected hash function to a corresponding private key element, $sk_i$, $m_i$ times. In another example, signature logic 332 may be configured to apply a selected chain function (that contains a hash function) to a corresponding private key element, $sk_i$, $m_i$ times. The selected signature operations may, thus, correspond to a selected hash-based signature scheme.

As described above, hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., "XMSS: Extended Hash-Based Signatures, released May, 2018, by the Internet Research Task Force (IRTF), Crypto Forum Research Group which may be found at https://tools.ietf.org/html/rfc8391.

A WOTS signature algorithm may be used to generate a signature and to verify a received signature utilizing a hash function. WOTS is further configured to use the private key and, thus, each private key element, $sk_i$, one time. For example, WOTS may be configured to apply a hash function to each private key element, $m_i$, or N-$m_i$ times to generate a signature and to apply the hash function to each received message element N-$m_{i'}$ or $m_{i'}$ times to generate a corresponding verification signature element. The Merkle many time signature scheme is a hash-based signature scheme that utilizes an OTS and may use a public key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. In some examples, the number of calls to the hash function included in the chain function may be fixed. Chain functions may improve security of an associated hash-based signature scheme.

Cryptography logic 340 is configured to perform various cryptographic and/or security functions on behalf of the signing device 310. In some embodiments, the cryptography logic 340 may be embodied as a cryptographic engine, an independent security co-processor of the signing device 310, a cryptographic accelerator incorporated into the processor (s) 320, or a standalone software/firmware. In some embodiments, the cryptography logic 340 may generate and/or utilize various cryptographic keys (e.g., symmetric/asymmetric cryptographic keys) to facilitate encryption, decryption, signing, and/or signature verification. Additionally, in some embodiments, the cryptography logic 340 may facilitate to establish a secure connection with remote devices over communication link. It should further be appreciated that, in some embodiments, the cryptography module 340 and/or another module of the first device 310 may establish a trusted execution environment or secure enclave within which a portion of the data described herein may be stored and/or a number of the functions described herein may be performed.

After the signature is generated as described above, the message, M, and signature may then be sent by first device 310, e.g., via communication logic 342, to second device 350 via network communication link 390. In an embodiment, the message, M, may not be encrypted prior to transmission. In another embodiment, the message, M, may be encrypted prior to transmission. For example, the message, M, may be encrypted by cryptography logic 340 to produce an encrypted message.

Second device 350 may also include one or more processors 360 and a memory 362 to store a public key 364. As described above, the processor(s) 360 may be embodied as any type of processor capable of performing the functions described herein. For example, the processor(s) 360 may be embodied as a single or multi-core processor(s), digital signal processor, microcontroller, or other processor or processing/controlling circuit. Similarly, the memory 362 may be embodied as any type of volatile or non-volatile memory or data storage capable of performing the functions described herein. In operation, the memory 362 may store various data and software used during operation of the second device 350 such as operating systems, applications, programs, libraries, and drivers. The memory 362 is communicatively coupled to the processor(s) 360.

In some examples the public key 364 may be provided to second device 350 in a previous exchange. The public key, $p_k$, is configured to contain a number L of public key elements, i.e., $p_k=[pk_1, \ldots, pk_L]$. The public key 364 may be stored, for example, to memory 362.

Second device 350 further comprises authentication logic 370 which includes hash logic 372, signature logic, and verification logic 376. As described above, hash logic 372 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIB Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 370 is configured to generate a verification signature based, at least in part, on the signature received from the first device and based, at least in part, on the received message representative (m'). For example, authentication logic 370 may configured to perform the same signature operations, i.e., apply the same hash function or chain function as applied by hash logic 332 of authentication logic 330, to each received message element a number, N-$m_{i'}$ (or $m_{i'}$), times to yield a verification message element. Whether a verification signature, i.e., each of the L verification message elements, corresponds to a corresponding public key element, $pk_i$, may then be determined. For example, verification logic 370 may be configured to compare each verification message element to the corresponding public key element, $pk_i$. If each of the verification message element matches the corresponding public key element, $p_{ki}$, then the verification corresponds to success. In other words, if all of the verification message elements match the public key elements, $p_{k1}, \ldots, pk_L$, then the verification corresponds to success. If any verification message element does not match the corresponding public key element, $pk_i$, then the verification corresponds to failure.

As described in greater detail below, in some examples the authentication logic 330 of the first device 310 includes one or more accelerators 338 that cooperate with the hash logic 332, signature logic 334 and/or verification logic 336 to accelerate authentication operations. Similarly, in some examples the authentication logic 370 of the second device 310 includes one or more accelerators 378 that cooperate with the hash logic 372, signature logic 374 and/or verification logic 376 to accelerate authentication operations. Examples of accelerators are described in the following paragraphs and with reference to the accompanying drawings.

The various modules of the environment 300 may be embodied as hardware, software, firmware, or a combination thereof. For example, the various modules, logic, and other components of the environment 300 may form a portion of, or otherwise be established by, the processor(s) 320 of first device 310 or processor(s) 360 of second device 350, or other hardware components of the devices As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 4A:
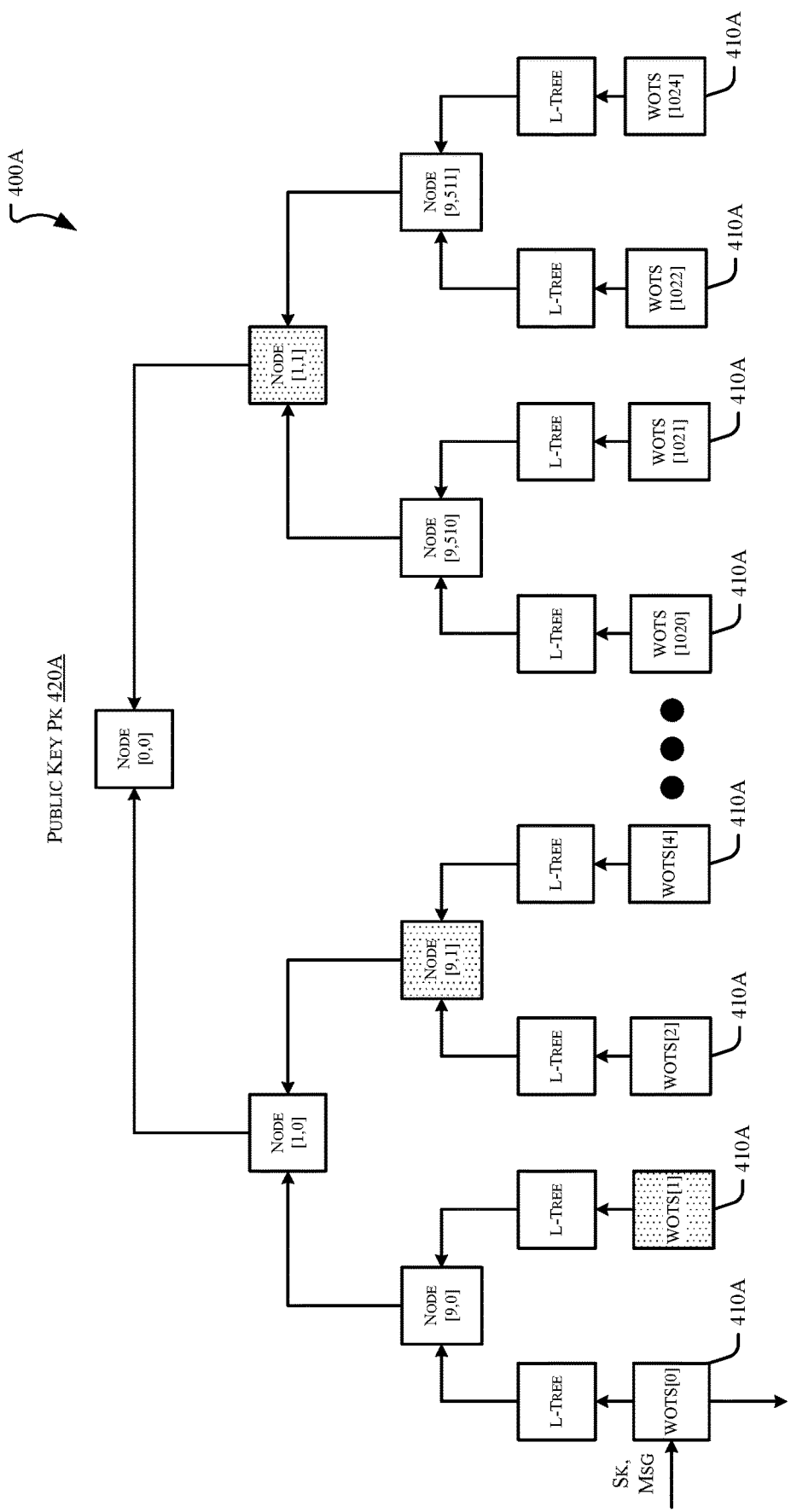
FIG. 4A is a schematic illustration of a Merkle tree structure, in accordance with some examples.

FIG. 4A is a schematic illustration of a Merkle tree structure illustrating signing operations, in accordance with some examples. Referring to FIG. 4A, an XMSS signing operation requires the construction of a Merkle tree 400A using the local public key from each leaf WOTS node 410 to generate a global public key (PK) 420. In some examples the authentication path and the root node value can be computed off-line such that these operations do not limit performance. Each WOTS node 410 has a unique secret key, "sk" which is used to sign a message only once. The XMSS signature consists of a signature generated for the input message and an authentication path of intermediate tree nodes to construct the root of the Merkle tree.

Figure 4B:
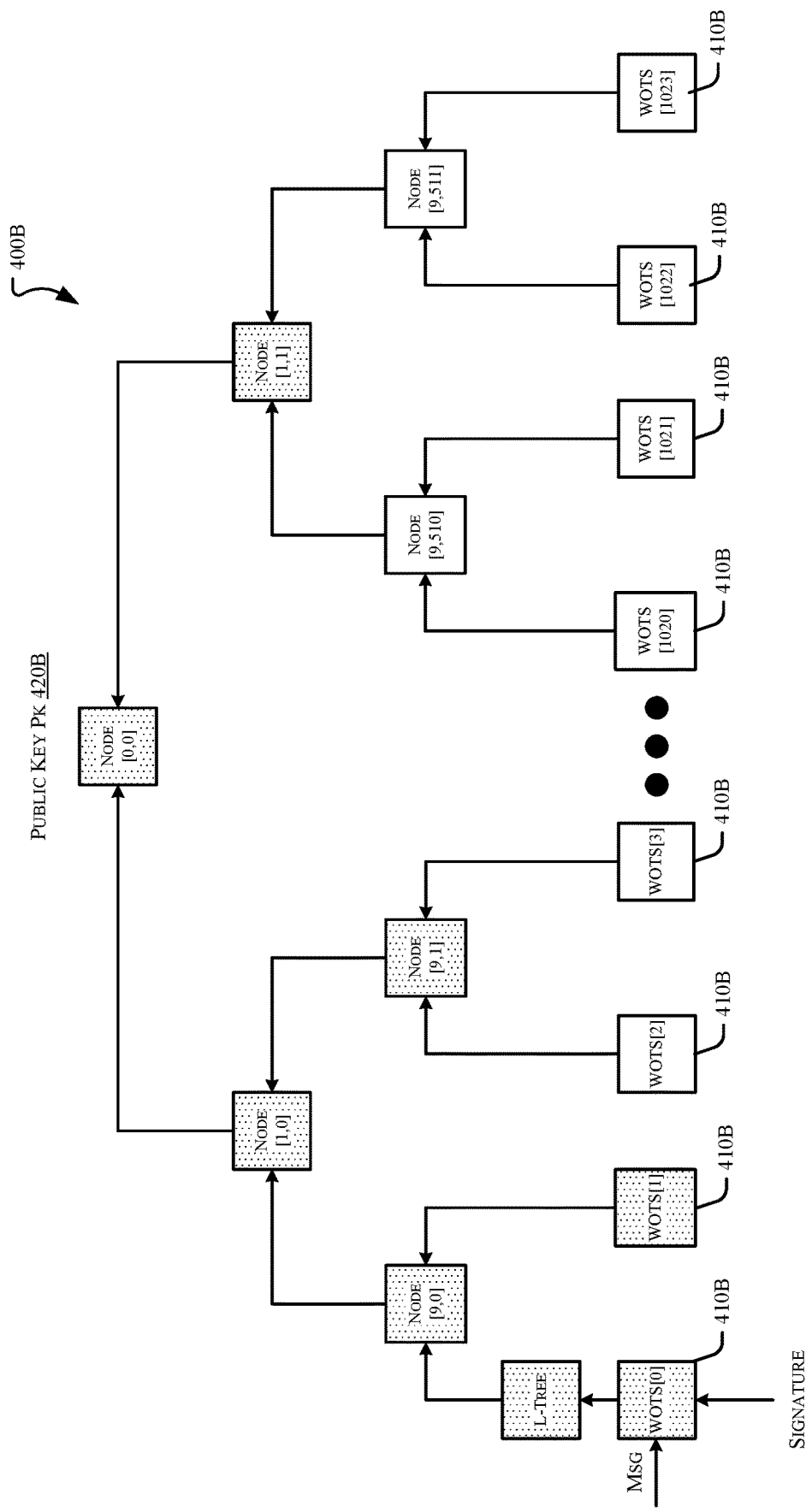
FIG. 4B is a schematic illustration of a Merkle tree structure, in accordance with some examples.

FIG. 4B is a schematic illustration of a Merkle tree structure 400B during verification, in accordance with some examples. During verification, the input message and signature are used to compute the local public key 420B of the WOTS node, which is further used to compute the tree root value using the authentication path. A successful verification will match the computed tree root value to the public key PK shared by the signing entity. The WOTS and L-Tree operations constitute a significant portion of XMSS sign/verify latency respectively, thus defining the overall performance of the authentication system. Described herein are various pre-computation techniques which may be implemented to speed-up authentication path computations, thereby improving XMSS performance. The techniques are applicable to the other hash options and scale well for both software and hardware implementations.

Figure 5:
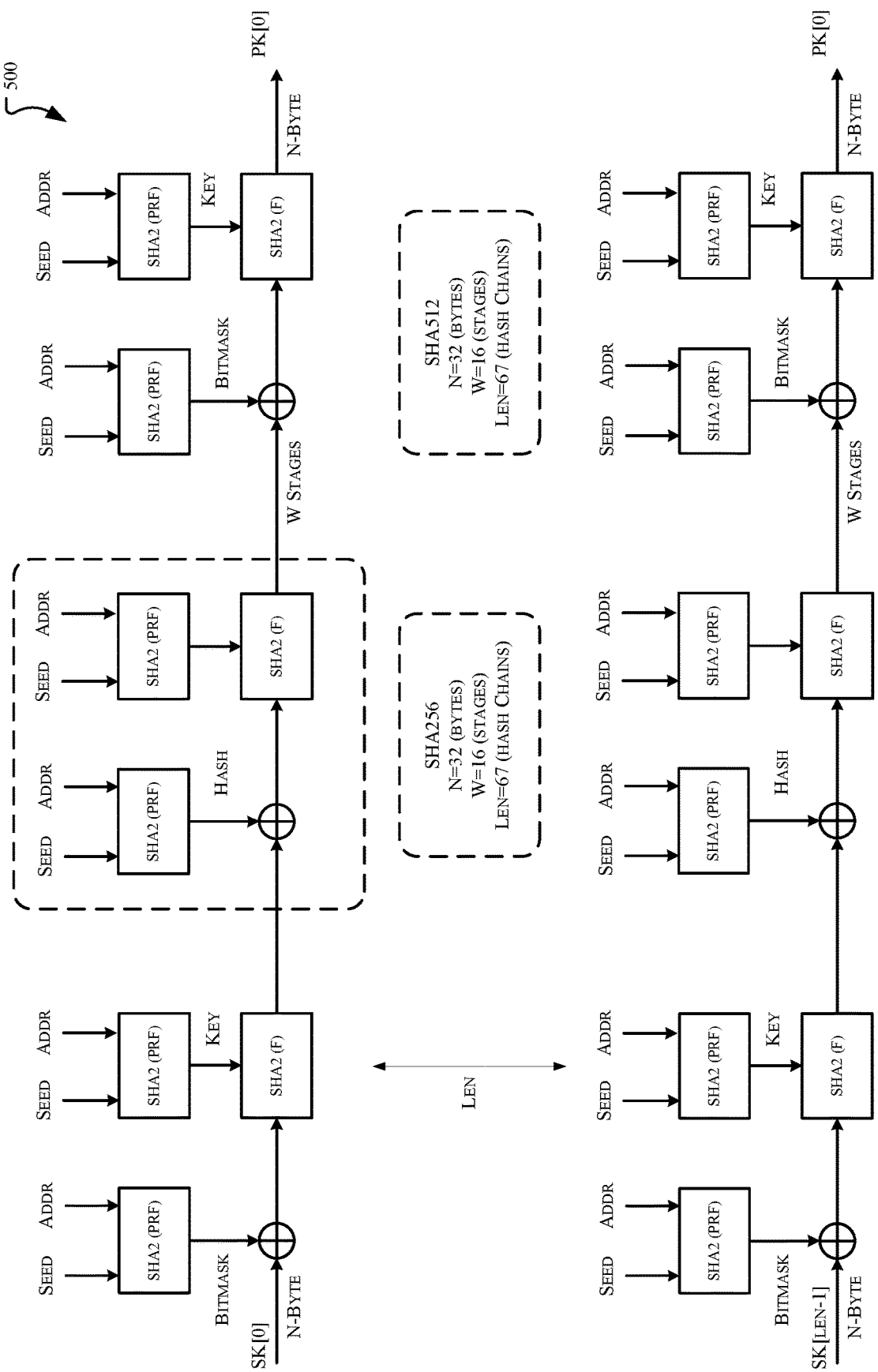
FIG. 5 is a schematic illustration of a compute blocks in an architecture to implement a signature algorithm, in accordance with some examples.

FIG. 5 is a schematic illustration of a compute blocks in an architecture 500 to implement a signature algorithm, in accordance with some examples. Referring to FIG. 5, the WOTS+ operation involves 67 parallel chains of 16 SHA2-256 HASH functions, each with the secret key sk[66:0] as input. Each HASH operation in the chain consists of 2 pseudo-random functions (PRF) using SHA2-256 to generate a bitmask and a key. The bitmask is XOR-ed with the previous hash and concatenated with the key as input message to a 3rd SHA2-256 hash operation. The 67×32-byte WOTS public key pk[66:0] is generated by hashing secret key sk across the 67 hash chains.

Figure 6A:
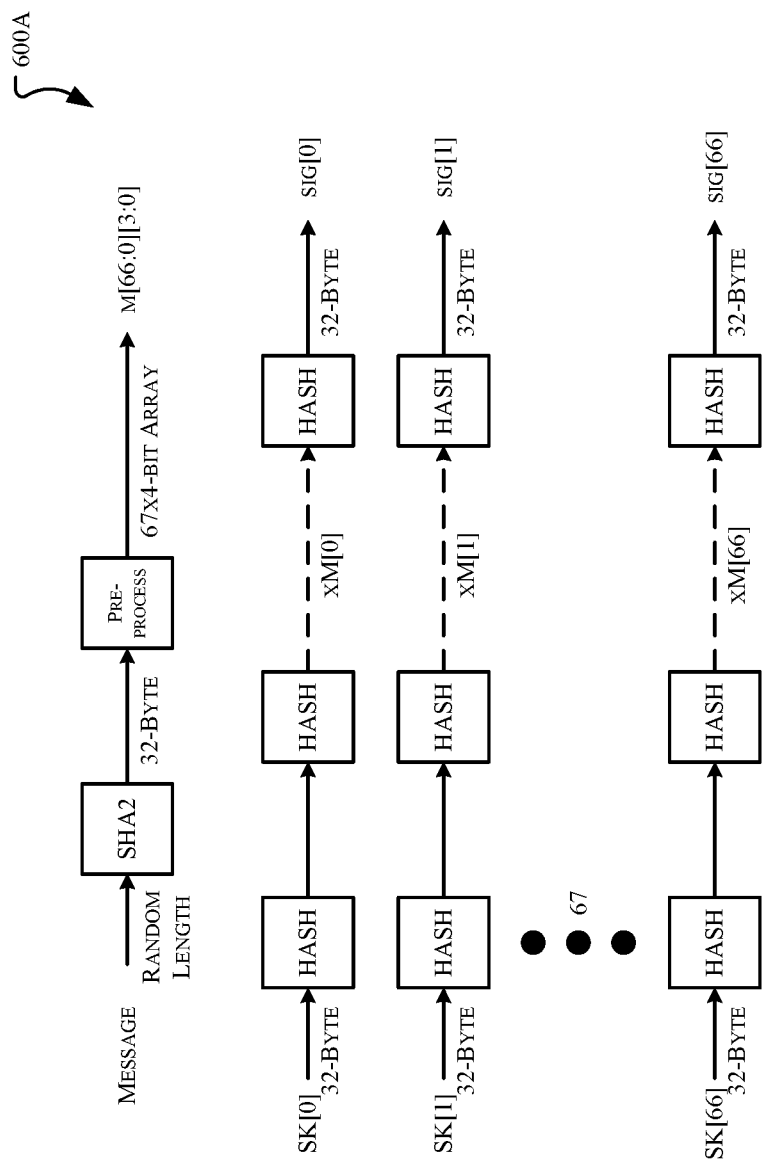
FIG. 6A is a schematic illustration of a compute blocks in an architecture to implement signature generation in a signature algorithm, in accordance with some examples.

FIG. 6A is a schematic illustration of a compute blocks in an architecture 600A to implement signature generation in a signature algorithm, in accordance with some examples. As illustrated in FIG. 6A, for message signing, the input message is hashed and pre-processed to compute a 67×4-bit value, which is used as an index to choose an intermediate hash value in each operation of the chain function.

Figure 6B:
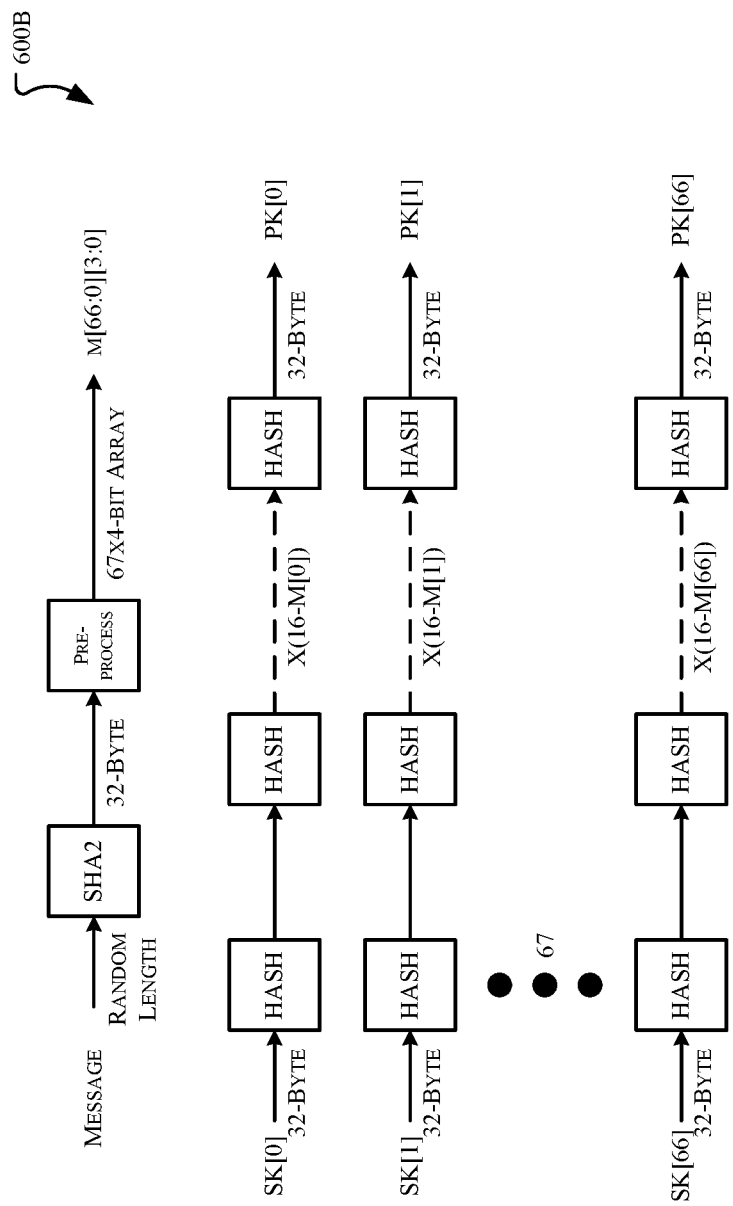
FIG. 6B is a schematic illustration of a compute blocks in an architecture to implement signature verification in a verification algorithm, in accordance with some examples.

FIG. 6B is a schematic illustration of a compute blocks in an architecture 600B to implement signature verification in a verification algorithm, in accordance with some examples. Referring to FIG. 6B, during verification, the message is again hashed to compute the signature indices and compute the remaining HASH operations in each chain to compute the WOTS public key pk. This value and the authentication path are used to compute the root of the Merkle tree and compare with the shared public key PK to verify the message.

Odd Index Precomputation for Authentication Path Computation

As described above, Hash-Based Signature (HBS) algorithms such as XMSS and LMS schemes offer a promising approach for post-quantum digital signatures. HBS algorithms use one-time signature algorithms as a fundamental building block. The main limitation of one-time signature algorithms is that each key pair can sign only a single message. HBS schemes such as XMSS and LMS may use processes such as an L-Tree computation to combine a large number of one-time key pairs into a single multi-time HBS key pair. To generate a signature of a given message, the signing device signs the message using one unused one-time key pair to produce a one-time signature of the message. Additionally, the signing device needs to produce an Authentication Path of that signature through a Merkle tree structure. This authentication path is used to confirm that the used one-time key pair is part of the set of one-time key pairs represented by the single multi-time HBS key pair. For signature verification, the verifying device at first checks that the one-time signature is authentic and then by using the authentication path the verifier checks that the signature was produced by a valid one-time key pair.

Figure 7:
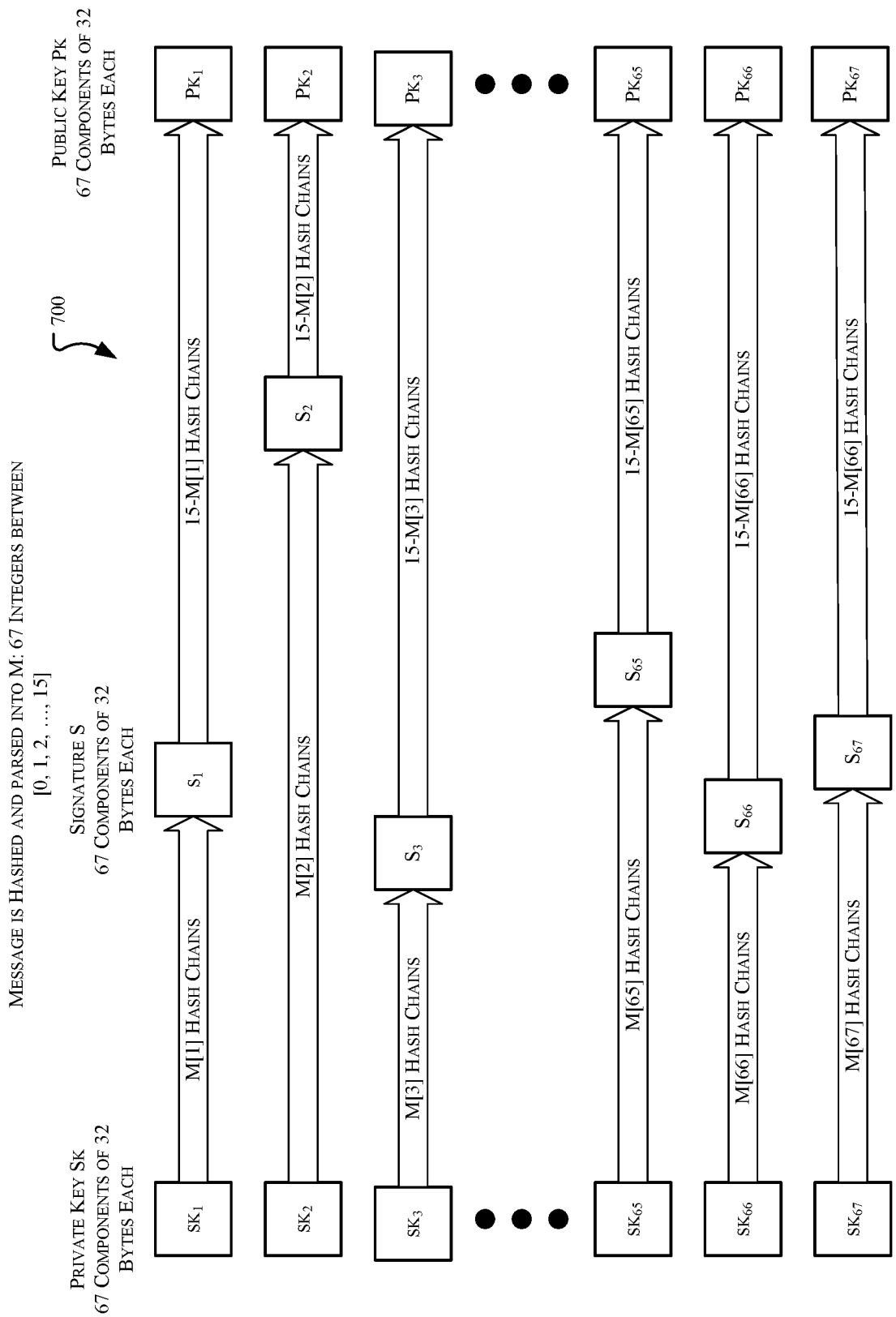
FIG. 7 is a schematic illustration of a signature and verification scheme, in accordance with some examples.

FIG. 7 is a schematic illustration of a one-time signature and verification scheme, in accordance with some examples. Referring to FIG. 7, in some examples the one-time signature keygen/sign/verify algorithms 700 operate on a message which is spread over 67 chunks of 32 bytes each. More precisely, the private key (sk) is composed of 67 chunks of 32 bytes each ($sk_1 \ldots sk_{67}$), the signature (s) is composed by 67 chunks of 32 bytes each ($s_1 \ldots s_{67}$), and the public key (pk) is composed by 67 chunks of 32 bytes each ($pk_1 \ldots pk_{67}$). To generate the public key (pk) from the private key (sk), the one-time algorithm applies a hash chain function 15 times. The signature (s) of a message m is generated as follows. At first, the message is hashed and then encoded into 67 integers between 0 and 15. The signature of the message m is the result of applying the hash chain over the private key chunk $sk_i$ exactly $m_i$ times, where $m_i$ denotes the i-th integer that represents (in encoded format) the message to be signed.

Thus, given a private key (pk) and a message (m) it is possible to compute the signature (s). Given the signature (s) and the message (m), it is possible to reconstruct the associated one-time public key (pk) at the verifying device without access to the private key (sk). If the reconstructed public key (pk) matches the one-time public key (pk) of the signing device, then the signature is deemed authentic. If not, it is deemed rejected as not authentic.

HBS signatures such as XMSS are composed by one-time signatures plus a set of 32-bytes nodes referred to as an authentication path. For signatures of even index, the first node of the authentication path is a compressed version of the one-time public key (pk) of the subsequent odd index that is used to verify the next message. Also, to compute a one-time public key (pk), the user needs to compute 67×15 different 32-bytes intermediate values. Among these 67×15 intermediate values, there are 67 of them (in a specific order) that convey the next one-time signature (i.e., the message to be signed will select which value and at which order such values are picked). Thus, the 67×15 intermediate values required in the authentication path computation of signatures of even index may be stored to save the cost of generating signatures of odd index. In some examples a similar approach can be used to partially save the cost of generating authentication path of signatures of odd index.

Figure 8:
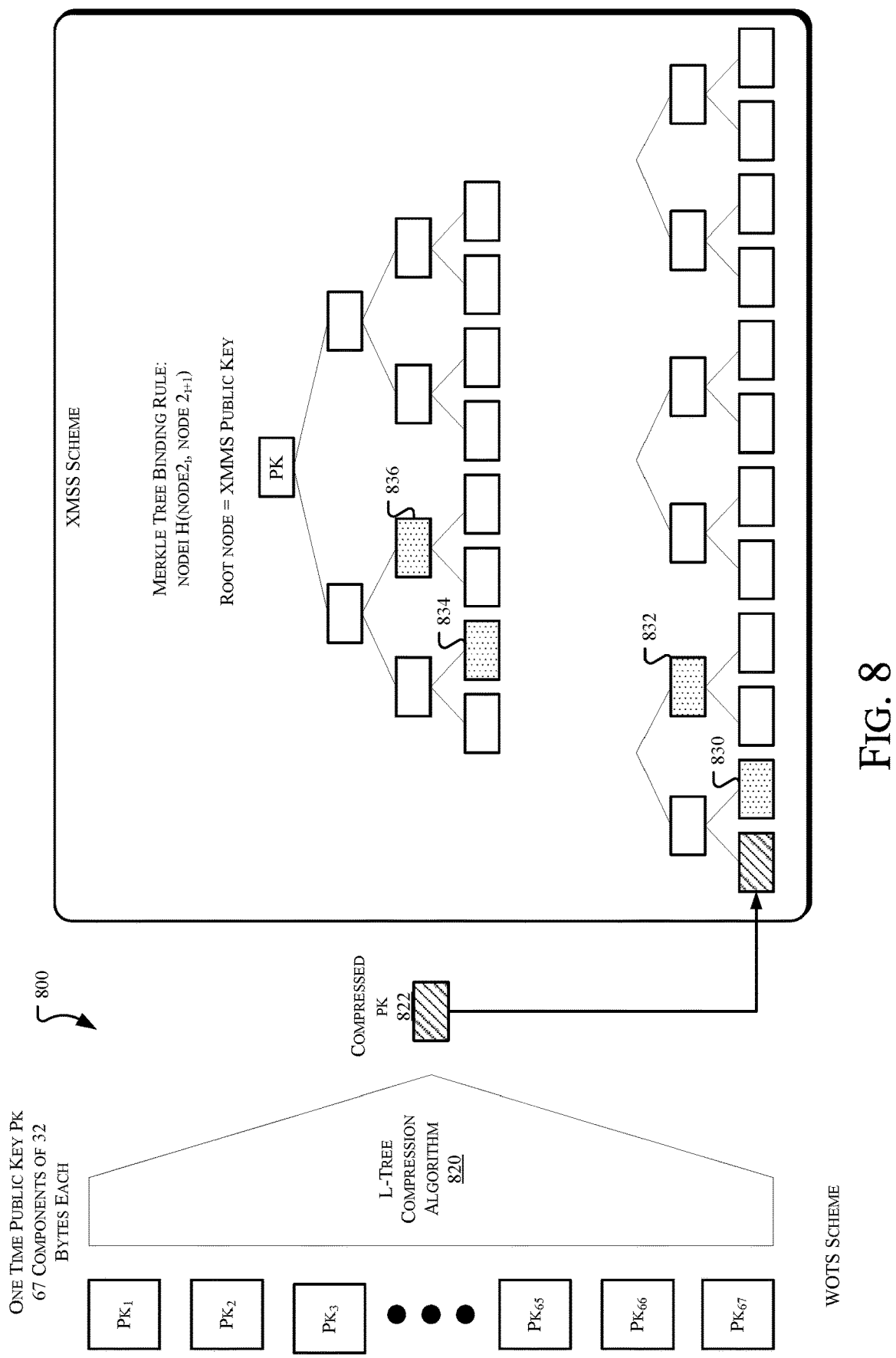
FIG. 8 is a schematic illustration of a signature and verification scheme, in accordance with some examples.

FIG. 8 is a schematic illustration of a WOTS signature and verification scheme 800, in accordance with some examples. Referring to FIG. 8, HBS schemes combine a large number of one-time key pairs ($pk_1, pk_2, \ldots, pk_{67}$) into one single multi-time key pair. This may be performed by using a Merkle tree which, as described above, is a binary tree that has leaf nodes that are compressed versions of the one-time public keys. This compression of the one-time public key (pk) is done by an L-Tree Compression algorithm 820 which compresses 67 chunks of 32 bytes into a compressed public key 822 of 32 bytes, which is input as the first node of the Merkle tree. As described above, given the leaf nodes, the Merkle tree is built by generating a parent node as the hash of the two children nodes concatenated. Therefore, it is possible to construct the root node of a Merkle tree given its leaf nodes. The Merkle root node corresponds to the HBS multi-time public-key.

FIG. 8 illustrates how a one-time public key is plugged into a Merkle tree. Given a one-time public key (pk) and the intermediate nodes 830, 832, 834, 836 filled in a light-shaded gray (i.e., authentication path nodes) a verifier can reconstruct the root node of the Merkle tree by following the construction rule mentioned above. The verifier checks if the signature is authentic by reconstructing the root node and verifying that the root node matches with the HBS public key (then signature is rejected otherwise).

Figure 9:
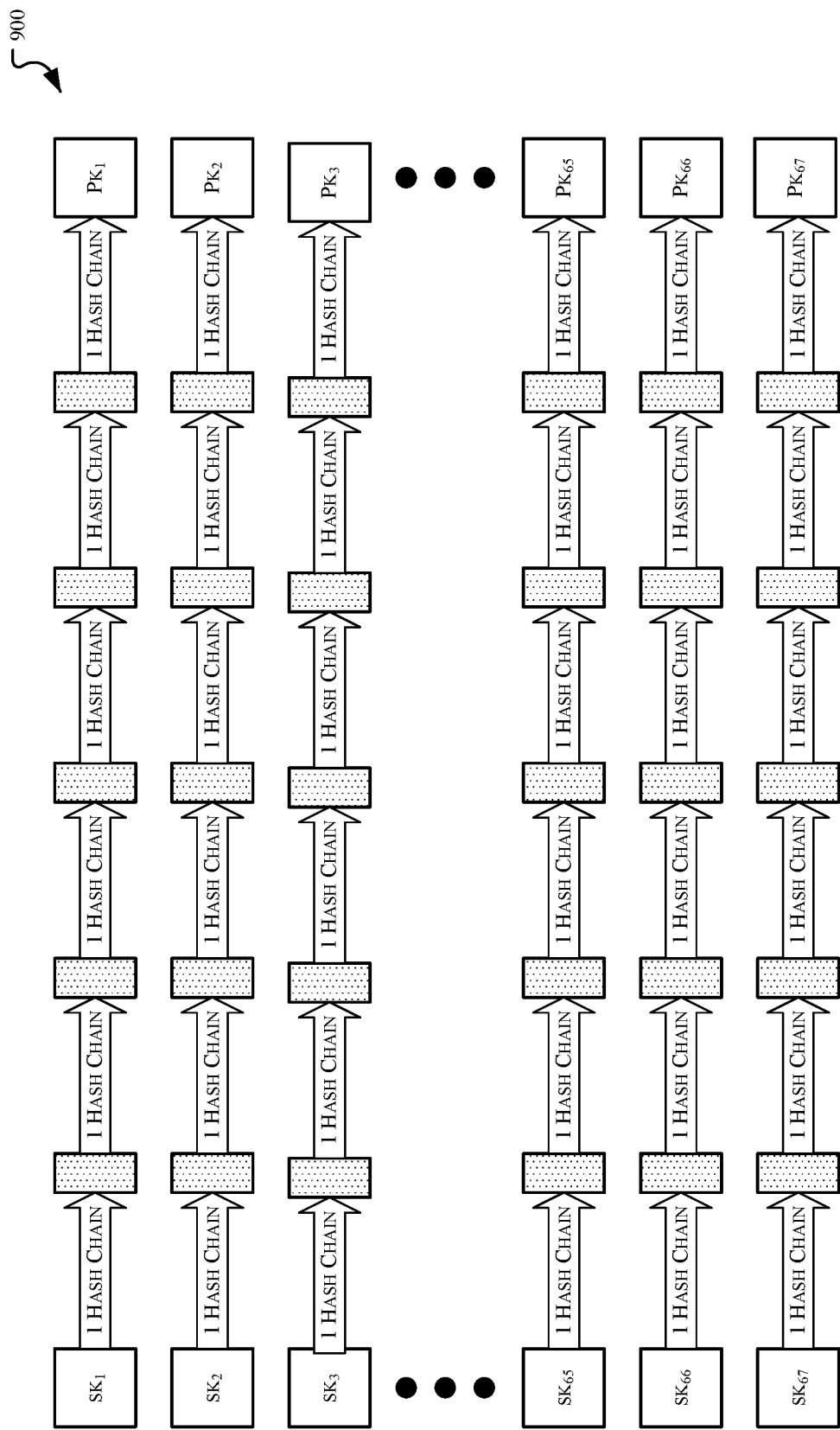
FIG. 9 is a schematic illustration of a signature and verification scheme, in accordance with some examples.

FIG. 9 is a schematic illustration of a signature and verification scheme 900, in accordance with some examples. Referring to FIG. 9, it is noted that the first node of the authentication path of a signature of even index (for example, 0, 2, 4, . . . ) consists of the compressed version of the one-time public key (pk) related to the next (odd) signature (for example, 1, 3, 5, . . . ). The one-time public key (pk) is constructed from the associated one-time private key (sk), as described above. As illustrated in FIG. 7, inbetween the one-time private key (sk) and the one-time public key (pk), there are intermediate nodes that will compose the signature (s). Therefore, in some examples a signing device can store in a computer-readable memory all such intermediate nodes between the one-time private key (sk) and the one-time public key (pk) which are used to generate the first authentication path node. FIG. 8 highlights one example of the intermediate nodes 830, 832, 834, 836 that need to be stored during this process. In some examples, this technique requires a total of (67×15×32 bytes=≈32 KB) of additional memory to be allocated during the signature process, However, this memory overhead saves the cost of generating signatures having odd index. In scenarios in which the additional memory overhead is a limitation, selective intermediate nodes can be stored during authentication path computation and used as start point during actual message signing. This provides a trade-off between memory overhead and increasing the speed of the signature process signing.

Figure 10:
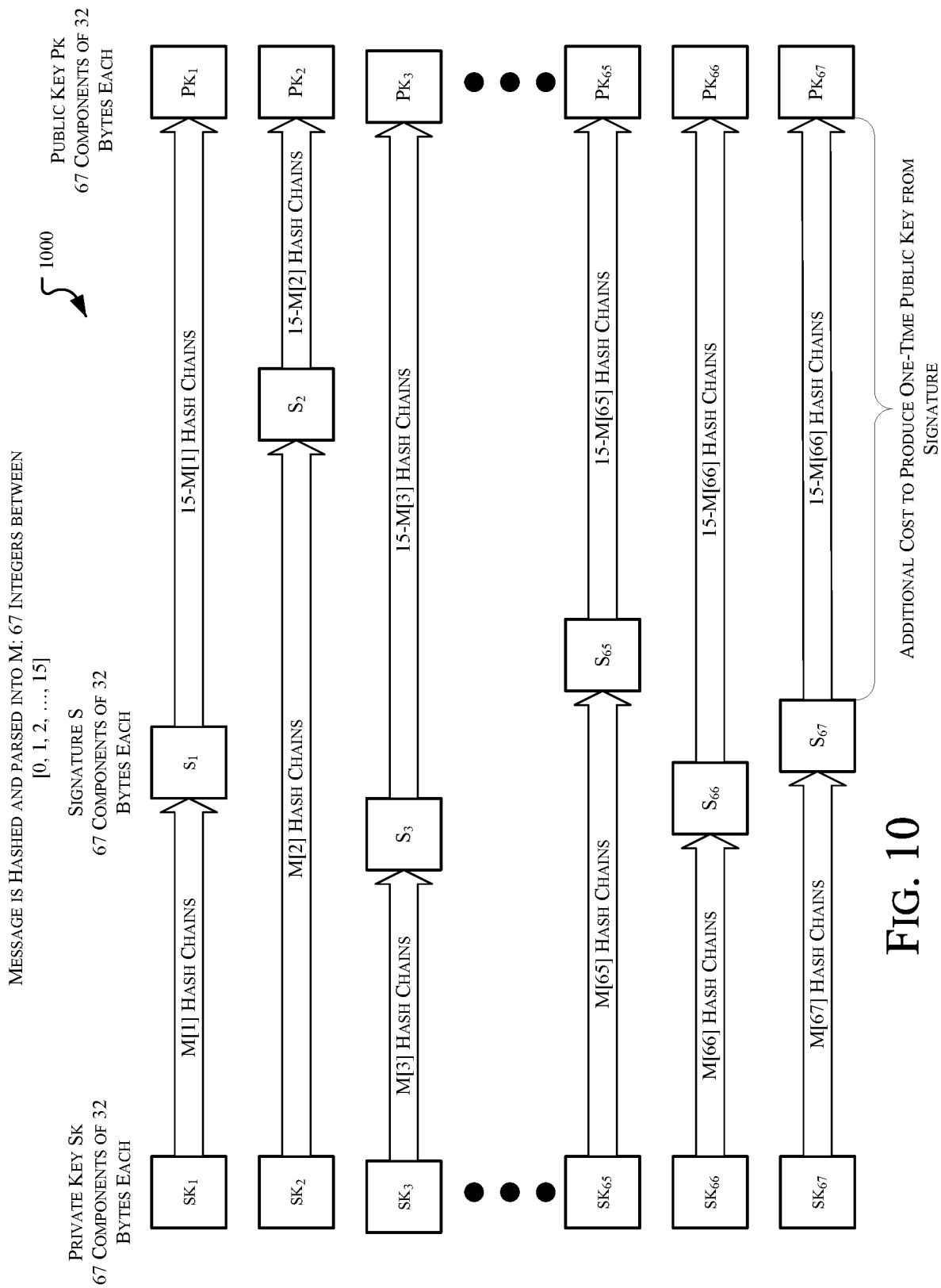
FIG. 10 is a schematic illustration of a signature and verification scheme, in accordance with some examples.

FIG. 10 is a schematic illustration of a signature and verification scheme 1000, in accordance with some examples. Referring to FIG. 10, in some examples a similar approach may be used to improve the efficiency of authentication path computation of odd index components. During the signature generation procedure for an even-index such a procedure, the signing device necessarily computes intermediate nodes in hash chains that, if completed, would result in a one-time public key that will be required as the first node of the authentication path of the next (odd-index) signature. Thus, in some examples the signing device may continue computing hash chains from the signature to the point at which the associated one-time public key (pk) is obtained. These public key components may then be provided with the signature to the verifying device. In other examples the verifying device may receive the signature and, during verification, compute the one-time public key and store it in memory. The authentication path node related to this public key does not need to be transmitted by the signing device since the signing device already has it from previous signature verification. Thus, both the signing device and the verifying device can do utilize this technique of computing the one-time public key needed for next signature authentication path.

This pre-computation would require 67×(15/2) additional hash chain computations during the signature process to compute the one-time public key, on average, as opposed to 67×15 hash chain computations required in a conventional implementation that would build such one-time public key from the one-time private key, instead of from the signature. Therefore, this precomputation offers a 50% speedup in the process of building the first node of the authentication of odd-index signatures, on average.

Figure 11:
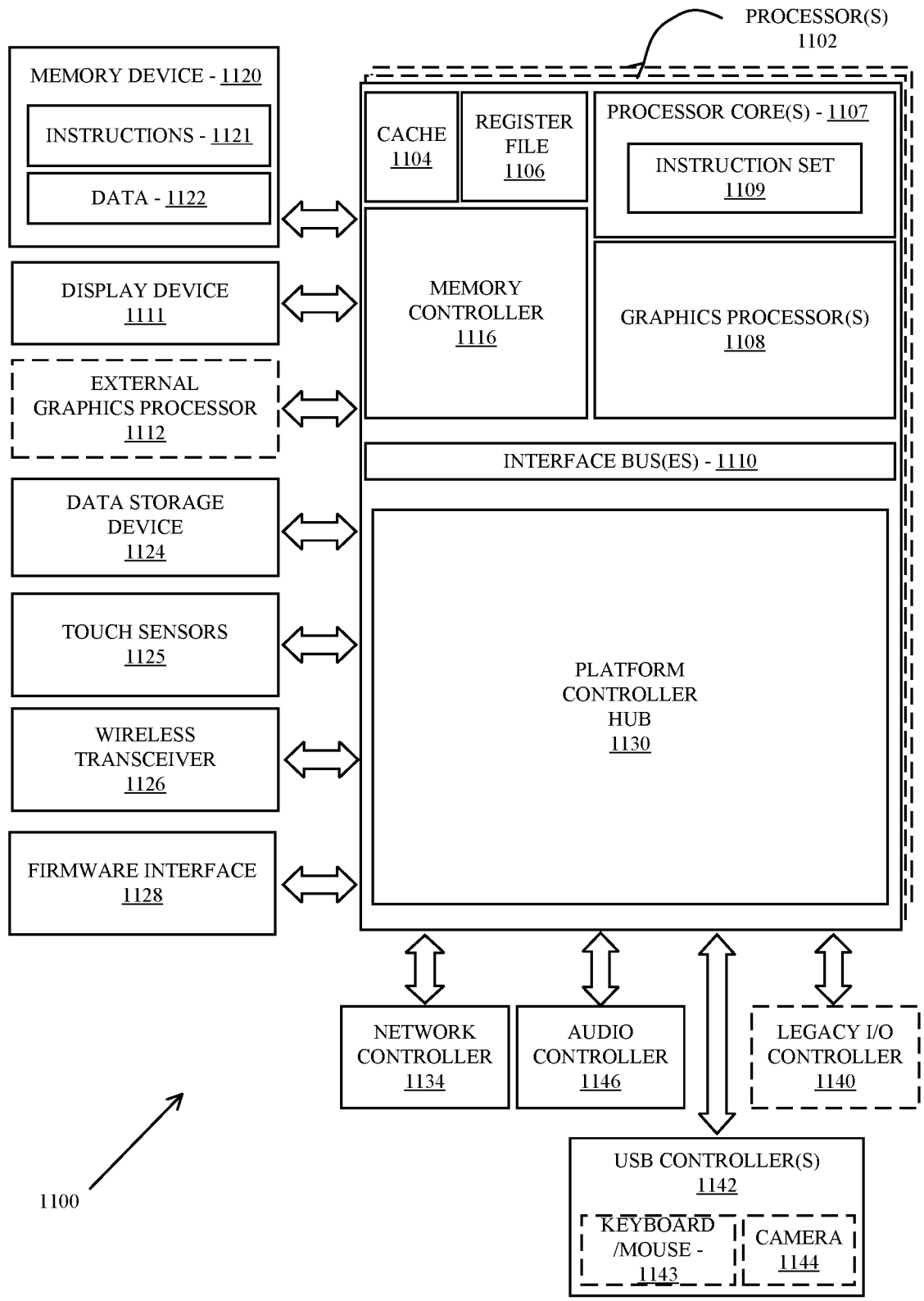
FIG. 11 is a schematic illustration of a computing architecture which may be adapted to implement hardware acceleration in accordance with some examples.

FIG. 11 illustrates an embodiment of an exemplary computing architecture that may be suitable for implementing various embodiments as previously described. In various embodiments, the computing architecture 1100 may comprise or be implemented as part of an electronic device. In some embodiments, the computing architecture 1100 may be representative, for example of a computer system that implements one or more components of the operating environments described above. In some embodiments, computing architecture 1100 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 includes one or more processors 1102 and one or more graphics processors 1108, and may be a single processor desktop system, a multiprocessor workstation system, or a server system having a large number of processors 1102 or processor cores 1107. In on embodiment, the system 1100 is a processing platform incorporated within a system-on-a-chip (SoC or SOC) integrated circuit for use in mobile, handheld, or embedded devices.

An embodiment of system 1100 can include, or be incorporated within a server-based gaming platform, a game console, including a game and media console, a mobile gaming console, a handheld game console, or an online game console. In some embodiments system 1100 is a mobile phone, smart phone, tablet computing device or mobile Internet device. Data processing system 1100 can also include, couple with, or be integrated within a wearable device, such as a smart watch wearable device, smart eyewear device, augmented reality device, or virtual reality device. In some embodiments, data processing system 1100 is a television or set top box device having one or more processors 1102 and a graphical interface generated by one or more graphics processors 1108.

In some embodiments, the one or more processors 1102 each include one or more processor cores 1107 to process instructions which, when executed, perform operations for system and user software. In some embodiments, each of the one or more processor cores 1107 is configured to process a specific instruction set 1109. In some embodiments, instruction set 1109 may facilitate Complex Instruction Set Computing (CISC), Reduced Instruction Set Computing (RISC), or computing via a Very Long Instruction Word (VLIW). Multiple processor cores 1107 may each process a different instruction set 1109, which may include instructions to facilitate the emulation of other instruction sets. Processor core 1107 may also include other processing devices, such a Digital Signal Processor (DSP).

In some embodiments, the processor 1102 includes cache memory 1104. Depending on the architecture, the processor 1102 can have a single internal cache or multiple levels of internal cache. In some embodiments, the cache memory is shared among various components of the processor 1102. In some embodiments, the processor 1102 also uses an external cache (e.g., a Level-3 (L3) cache or Last Level Cache (LLC)) (not shown), which may be shared among processor cores 1107 using known cache coherency techniques. A register file 1106 is additionally included in processor 1102 which may include different types of registers for storing different types of data (e.g., integer registers, floating point registers, status registers, and an instruction pointer register). Some registers may be general-purpose registers, while other registers may be specific to the design of the processor 1102.

In some embodiments, one or more processor(s) 1102 are coupled with one or more interface bus(es) 1110 to transmit communication signals such as address, data, or control signals between processor 1102 and other components in the system. The interface bus 1110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1102 include an integrated memory controller 1116 and a platform controller hub 1130. The memory controller 1116 facilitates communication between a memory device and other components of the system 1100, while the platform controller hub (PCH) 1130 provides connections to I/O devices via a local I/O bus.

Memory device 1120 can be a dynamic random-access memory (DRAM) device, a static random-access memory (SRAM) device, flash memory device, phase-change memory device, or some other memory device having suitable performance to serve as process memory. In one embodiment the memory device 1120 can operate as system memory for the system 1100, to store data 1122 and instructions 1121 for use when the one or more processors 1102 executes an application or process. Memory controller hub 1116 also couples with an optional external graphics processor 1112, which may communicate with the one or more graphics processors 1108 in processors 1102 to perform graphics and media operations. In some embodiments a display device 1111 can connect to the processor(s) 1102. The display device 1111 can be one or more of an internal display device, as in a mobile electronic device or a laptop device or an external display device attached via a display interface (e.g., DisplayPort, etc.). In one embodiment the display device 1111 can be a head mounted display (HMD) such as a stereoscopic display device for use in virtual reality (VR) applications or augmented reality (AR) applications.

In some embodiments the platform controller hub 1130 enables peripherals to connect to memory device 1120 and processor 1102 via a high-speed I/O bus. The I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). The data storage device 1124 can connect via a storage interface (e.g., SATA) or via a peripheral bus, such as a Peripheral Component Interconnect bus (e.g., PCI, PCI Express). The touch sensors 1125 can include touch screen sensors, pressure sensors, or fingerprint sensors. The wireless transceiver 1126 can be a Wi-Fi transceiver, a Bluetooth transceiver, or a mobile network transceiver such as a 3G, 4G, or Long Term Evolution (LTE) transceiver. The firmware interface 1128 enables communication with system firmware, and can be, for example, a unified extensible firmware interface (UEFI). The network controller 1134 can enable a network connection to a wired network. In some embodiments, a high-performance network controller (not shown) couples with the interface bus 1110. The audio controller 1146, in one embodiment, is a multi-channel high definition audio controller. In one embodiment the system 1100 includes an optional legacy I/O controller 1140 for coupling legacy (e.g., Personal System 2 (PS/2)) devices to the system. The platform controller hub 1130 can also connect to one or more Universal Serial Bus (USB) controllers 1142 connect input devices, such as keyboard and mouse 1143 combinations, a camera 1144, or other USB input devices.

The following pertains to further examples.

Example 1 is an comprising a computer-readable memory; signature logic to compute a message hash of an input message using a secure hash algorithm; process the message hash to generate an array of secret key components for the input message; apply a hash chain function to the array of secret key components to generate an array of signature components, the hash chain function comprising a series of even-index hash chains and a series of odd-index has chains, wherein the even-index hash chains and the odd-index hash chains generate a plurality of intermediate node values and a one-time public key component between the secret key components and the signature components; and store at least some of the intermediate node values in the computer-readable memory for use in one or more subsequent signature operations.

In Example 2, the subject matter of Example 1 can optionally include logic to compute the message hash of the input message using at least one of a Winterniz One Time Signature (WOTS) scheme or a WOTS+ scheme that invokes a secure hash algorithm (SHA) hash function.

In Example 3, the subject matter of any one of Examples 1-2 can optionally include logic to store the intermediate node values generated and one time public key components generated by the even-index hash chains in the computer-readable memory; and use the one-time public key components to define computations through an authentication path through a Merkle tree.

In Example 4, the subject matter of any one of Examples 1-3 can optionally include logic to apply a L-tree operation to the public key components to compress the public key components into a single leaf node value; and provide the single leaf node value as an input to the Merkle tree.

In Example 5, the subject matter of any one of Examples 1-4 can optionally include logic to perform a first hash operations using the single leaf node value and a first odd-index public key component to generate a first parent node in the Merkle tree; and perform a series of hash operations using subsequent odd-index public key components to determine a root node value of the Merkle tree.

In Example 6, the subject matter of any one of Examples 1-5 can optionally include logic to compare the root node value of the Merkle tree to a multi-signature public key value associated with the signing device; and generate an authentication signal when the root node value of the Merkle tree matches the multi-signature public key value associated with the signing device.

In Example 7, the subject matter of any one of Examples 1-6 can optionally include logic to compare the root node value of the Merkle tree to a multi-signature public key value associated with the signing device; and generate an authentication signal when the root node value of the Merkle tree matches the multi-signature public key value associated with the signing device.

Example 8 is a computer-implemented method, comprising computing a message hash of an input message using a secure hash algorithm; processing the message hash to generate an array of secret key components for the input message; applying a hash chain function to the array of secret key components to generate an array of signature components, the hash chain function comprising a series of even-index hash chains and a series of odd-index has chains, wherein the even-index hash chains and the odd-index hash chains generate a plurality of intermediate node values and a one-time public key component between the secret key components and the signature components; and storing at least some of the intermediate node values in the computer-readable memory for use in one or more subsequent signature operations.

In Example 9, the subject matter of Example 8 can optionally include computing the message hash of the input message using at least one of a Winterniz One Time Signature (WOTS) scheme or a WOTS+ scheme that invokes a secure hash algorithm (SHA) hash function.

In Example 10, the subject matter of any one of Examples 8-9 can optionally include storing the intermediate node values generated and one time public key components generated by the even-index hash chains in the computer-readable memory; and using the one-time public key components to define computations through an authentication path through a Merkle tree.

In Example 11, the subject matter of any one of Examples 8-10 can optionally include applying a L-tree operation to the public key components to compress the public key components into a single leaf node value; and providing the single leaf node value as an input to the Merkle tree.

In Example 12 the subject matter of any one of Examples 8-11 can optionally include performing a first hash operations using the single leaf node value and a first odd-index public key component to generate a first parent node in the Merkle tree; and performing a series of hash operations using subsequent odd-index public key components to determine a root node value of the Merkle tree.

In Example 13 the subject matter of any one of Examples 8-12 can optionally include comparing the root node value of the Merkle tree to a multi-signature public key value associated with the signing device; and generating an authentication signal when the root node value of the Merkle tree matches the multi-signature public key value associated with the signing device.

In Example 14 the subject matter of any one of Examples 8-13 can optionally include comparing the root node value of the Merkle tree to a multi-signature public key value associated with the signing device; and generating an authentication fail signal when the root node value of the Merkle tree does not match the multi-signature public key value associated with the signing device.

Example 15 is a non-transitory computer-readable medium comprising instructions which, when executed by a processor, configure the processor to perform operations, comprising storing a public key associated with a signing device in a computer-readable medium; computing a message hash of an input message using a secure hash algorithm; processing the message hash to generate an array of secret key components for the input message; applying a hash chain function to the array of secret key components to generate an array of signature components, the hash chain function comprising a series of even-index hash chains and a series of odd-index has chains, wherein the even-index hash chains and the odd-index hash chains generate a plurality of intermediate node values and a one-time public key component between the secret key components and the signature components; and storing at least some of the intermediate node values in the computer-readable memory for use in one or more subsequent signature operations.

In Example 16, the subject matter of Example 15 can optionally include instructions which, when executed by the processor, configure the processor to perform operations, comprising computing the message hash of the input message using at least one of a Winterniz One Time Signature (WOTS) scheme or a WOTS+ scheme that invokes a secure hash algorithm (SHA) hash function.

In Example 17, the subject matter of any one of Examples 15-16 can optionally include instructions which, when executed by the processor, configure the processor to perform operations, comprising storing the intermediate node values generated and one time public key components generated by the even-index hash chains in the computer-readable memory; and using the one-time public key components to define computations through an authentication path through a Merkle tree.

In Example 18, the subject matter of any one of Examples 15-17 can optionally include instructions which, when executed by the processor, configure the processor to perform operations, comprising applying a L-tree operation to the public key components to compress the public key components into a single leaf node value; and providing the single leaf node value as an input to the Merkle tree.

In Example 19, the subject matter of any one of Examples 15-18 can optionally include instructions which, when executed by the processor, configure the processor to perform operations, comprising performing a first hash operations using the single leaf node value and a first odd-index public key component to generate a first parent node in the Merkle tree; and performing a series of hash operations using subsequent odd-index public key components to determine a root node value of the Merkle tree.

In Example 20, the subject matter of any one of Examples 15-19 can optionally include instructions which, when executed by the processor, configure the processor to perform operations, comprising comparing the root node value of the Merkle tree to a multi-signature public key value associated with the signing device; and generating an authentication signal when the root node value of the Merkle tree matches the multi-signature public key value associated with the signing device.

In Example 21, the subject matter of any one of Examples 15-20 can optionally include instructions which, when executed by the processor, configure the processor to perform operations, comprising comparing the root node value of the Merkle tree to a multi-signature public key value associated with the signing device; and generating an authentication fail signal when the root node value of the Merkle tree does not match the multi-signature public key value associated with the signing device.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a computer-readable memory;
signature logic to:
compute a message hash of an input message using a secure hash algorithm;
process the message hash to generate an array of secret key components for the input message;
apply a hash chain function to the array of secret key components to generate an array of signature components, the hash chain function comprising a series of even-index hash chains and a series of odd-index has chains, wherein the even-index hash chains and the odd-index hash chains generate a plurality of intermediate node values and a one-time public key component between the secret key components and the signature components;
store at least some of the intermediate node values in the computer-readable memory for use in one or more subsequent signature operations;
compute the message hash of the input message using at least one of a Winterniz One Time Signature (WOTS) scheme or a WOTS+ scheme that invokes a secure hash algorithm (SHA) hash function
apply a L-tree operation to the public key components to compress the public key components into a single leaf node value; and
provide the single leaf node value as an input to the Merkle tree.

2. The apparatus of claim 1, further comprising logic to:
store the intermediate node values generated and one time public key components generated by the even-index hash chains in the computer-readable memory; and
use the one-time public key components to define computations through an authentication path through a Merkle tree.

3. The apparatus of claim 1 the signature logic to:
perform a first hash operations using the single leaf node value and a first odd-index public key component to generate a first parent node in the Merkle tree; and
perform a series of hash operations using subsequent odd-index public key components to determine a root node value of the Merkle tree.

4. The apparatus of claim 3, comprising logic to:
compare the root node value of the Merkle tree to a multi-signature public key value associated with the signing device; and
generate an authentication success signal when the root node value of the Merkle tree matches the multi-signature public key value associated with the signing device.

5. The apparatus of claim 3, wherein:
compare the root node value of the Merkle tree to a multi-signature public key value associated with the signing device; and
generate an authentication fail signal when the root node value of the Merkle tree does not match the multi-signature public key value associated with the signing device.

6. A computer-implemented method, comprising:
computing a message hash of an input message using a secure hash algorithm;
processing the message hash to generate an array of secret key components for the input message;
applying a hash chain function to the array of secret key components to generate an array of signature components, the hash chain function comprising a series of even-index hash chains and a series of odd-index hash chains, wherein the even-index hash chains and the odd-index hash chains generate a plurality of intermediate node values and a one-time public key component between the secret key components and the signature components;

storing at least some of the intermediate node values in the computer-readable memory for use in one or more subsequent signature operations;

computing the message hash of the input message using at least one of a Winterniz One Time Signature (WOTS) scheme or a WOTS+ scheme that invokes a secure hash algorithm (SHA) hash function applying a L-tree operation to the public key components to compress the public key components into a single leaf node value; and providing the single leaf node value as an input to the Merkle tree.

7. The method of claim 6, further comprising:

storing the intermediate node values generated and one time public key components generated by the even-index hash chains in the computer-readable memory; and using the one-time public key components to define computations through an authentication path through a Merkle tree.

8. The method of claim 6, further comprising:

performing a first hash operations using the single leaf node value and a first odd-index public key component to generate a first parent node in the Merkle tree; and performing a series of hash operations using subsequent odd-index public key components to determine a root node value of the Merkle tree.

9. The method of claim 8, further comprising:

comparing the root node value of the Merkle tree to a multi-signature public key value associated with the signing device; and generating an authentication signal when the root node value of the Merkle tree matches the multi-signature public key value associated with the signing device.

10. The method of claim 8, further comprising:

comparing the root node value of the Merkle tree to a multi-signature public key value associated with the signing device; and generating an authentication fail signal when the root node value of the Merkle tree does not match the multi-signature public key value associated with the signing device.

11. A non-transitory computer-readable medium comprising instructions which, when executed by a processor, configure the processor to perform operations, comprising:

storing a public key associated with a signing device in a computer-readable medium;

computing a message hash of an input message using a secure hash algorithm;

processing the message hash to generate an array of secret key components for the input message;

applying a hash chain function to the array of secret key components to generate an array of signature components, the hash chain function comprising a series of even-index hash chains and a series of odd-index hash chains, wherein the even-index hash chains and the odd-index hash chains generate a plurality of intermediate node values and a one-time public key component between the secret key components and the signature components; and storing at least some of the intermediate node values in the computer-readable memory for use in one or more subsequent signature operations;

computing the message hash of the input message using at least one of a Winterniz One Time Signature (WOTS) scheme or a WOTS+ scheme that invokes a secure hash algorithm (SHA) hash function applying a L-tree operation to the public key components to compress the public key components into a single leaf node value; and providing the single leaf node value as an input to the Merkle tree.

12. The non-transitory computer-readable medium of claim 11, further comprising instructions which, when executed by the processor, configure the processor to perform operations, comprising:

storing the intermediate node values generated and one time public key components generated by the even-index hash chains in the computer-readable memory; and using the one-time public key components to define computations through an authentication path through a Merkle tree.

13. The non-transitory computer-readable medium of claim 11, further comprising instructions which, when executed by the processor, configure the processor to perform operations, comprising:

performing a first hash operations using the single leaf node value and a first odd-index public key component to generate a first parent node in the Merkle tree; and performing a series of hash operations using subsequent odd-index public key components to determine a root node value of the Merkle tree.

14. The non-transitory computer-readable medium of claim 13, further comprising instructions which, when executed by the processor, configure the processor to perform operations, comprising:

comparing the root node value of the Merkle tree to a multi-signature public key value associated with the signing device; and generating an authentication signal when the root node value of the Merkle tree matches the multi-signature public key value associated with the signing device.

15. The non-transitory computer-readable medium of claim 13, further comprising instructions which, when executed by the processor, configure the processor to perform operations, comprising:

comparing the root node value of the Merkle tree to a multi-signature public key value associated with the signing device; and generating an authentication fail signal when the root node value of the Merkle tree does not match the multi-signature public key value associated with the signing device.

\* \* \* \* \*